(12) United States Patent
Gardiner (10) Patent No.: US 7,461,545 B2
(45) Date of Patent: Dec. 9, 2008

(54) METHOD AND APPARATUS FOR MONITORING CYCLIC VARIABILITY IN RECIPROCATING ENGINES

(76) Inventor: David Phillip Gardiner, 1718 Blue Mountain Rd., RR#4, Mallorytown, Ontario (CA) K0E 1R0

( * ) Notice: Subject to any disclaimer, the term of this patent is extended or adjusted under 35 U.S.C. 154(b) by 64 days.

(21) Appl. No.: 11/515,841

(22) Filed: Sep. 6, 2006

(65) Prior Publication Data

US 2007/0051170 A1 Mar. 8, 2007

Related U.S. Application Data

(60) Provisional application No. 60/714,836, filed on Sep. 8, 2005.

(51) Int. Cl.
*G01M 15/00* (2006.01)
(52) U.S. Cl. .................................. 73/114.02; 73/114.69
(58) Field of Classification Search .............. 73/114.02, 73/114.03, 114.04, 114.06, 114.13, 114.25, 73/114.52, 114.69
See application file for complete search history.

(56) References Cited

U.S. PATENT DOCUMENTS

| | | | |
|---|---|---|---|
| 3,939,711 A | 2/1976 | Hanaoka | |
| 4,122,720 A | 10/1978 | Podl | |
| 6,092,016 A * | 7/2000 | Sarangapani et al. | 701/102 |
| 6,675,639 B1 * | 1/2004 | Schricker et al. | 73/118.1 |
| 7,021,130 B2 * | 4/2006 | Schmidt | 73/118.1 |

OTHER PUBLICATIONS

D.P. Gardiner and M.F. Bardon; A Cyclic Variability Monitoring System Based Upon Cycle Resolved Exhaust Temperature Sensing. ASME Technical Paper ICEF2005-1294, Proceedings of ICEF2005 ASME Internal Combustion Engine Division.
2005 Fall Technical Conference, Sep. 11-14, 2005, Ottawa, Ontario, Canada.

* cited by examiner

*Primary Examiner*—Eric S McCall (57) ABSTRACT

A method and apparatus is presented for monitoring the cyclic variability of combustion or one or more cylinders of a reciprocating internal combustion engine. Exhaust temperature signals are acquired from one or more exhaust temperature sensors. Cycle-by-cycle values which are related to combustion characteristics are obtained from each exhaust temperature signal. Statistical parameters related to the dispersion of sets of the cycle-by-cycle values are then obtained. The statistical parameters are used to provide an indication of the cyclic variability of the engine.

28 Claims, 5 Drawing Sheets

METHOD AND APPARATUS FOR MONITORING CYCLIC VARIABILITY IN RECIPROCATING ENGINES

CROSS REFERENCES TO RELATED APPLICATIONS

This Application Claims the Benefit of Provisional Patent Application Ser. No. 60/714,836 Filed Sep. 8, 2005.

BACKGROUND

1. Field of Invention

The present invention is generally directed to the field of internal combustion engine monitoring and control systems and specifically to a method and system for monitoring cyclic variability in reciprocating engines.

2. Description of Prior Art

Reciprocating engines (also known as piston engines) compress and burn a quantity of fuel/air mixture in each cylinder during each engine cycle. A cycle is completed during one crankshaft revolution for two-stroke engines and takes two crankshaft revolutions for four-stroke engines. Within any given cylinder, successive cycles will exhibit variations in how quickly a given fraction of the fuel/air mixture is burned. This cycle to cycle variation is commonly referred to as cyclic variability and has long been recognized as a fundamental characteristic of reciprocating engines.

Cyclic variability impacts the torque and speed stability of the engine as well as the balance of load sharing between cylinders, the engine vibration levels and exhaust emissions produced by the engine. Therefore, cyclic variability must be limited to acceptable levels. The practical limits for cyclic variability depend upon the engine application.

Situations where some cycles have little or no combustion (known as misfiring) create high cyclic variability levels, and are unacceptable in almost all situations. Thus misfire detection may be considered as a rudimentary form of cyclic variability monitoring. However, it is much more desirable to be able to monitor lower levels of cyclic variability in situations where all of the cycles have complete or nearly complete. With this degree of engine monitoring capability, operation within acceptable cyclic variability limits could be maintained and misfiring could be avoided.

The most successful prior art schemes which have been used to monitor cyclic variability include in-cylinder pressure sensing, spark plug ion current sensing and instantaneous crank angle velocity sensing.

Drawbacks of in-cylinder pressure sensing include the need for a passage into the cylinder to mount the sensor, relatively high cost and limited durability.

Spark plug ion current sensing does not provide good sensitivity to low levels of cyclic variability and it cannot be used in engines without spark plugs such as diesel, dual fuel and gas diesel engines. It has also been shown that the achievement of good ion sensing performance in lean burn engines requires ignition system modifications such as short spark duration, large electrode area and shrouded spark plugs. These modifications tend to degrade the ability of the ignition system to ignite lean mixtures reliably.

Instantaneous crank angle velocity sensing systems do not provide individual signals from the individual cylinders of multi-cylinder engines. This limits the ability of these systems to detect low levels of cyclic variability. The crank angle velocity measurements of these systems are also susceptible to mechanical perturbations such as shocks and vibrations and are affected by crankshaft tensional behavior.

The use of exhaust gas temperature measurements in engine monitoring systems is well known in prior art. Sheathed thermocouples are the most commonly used type of exhaust temperature sensor. It is common for each cylinder of large stationary engines to be equipped with an exhaust temperature thermocouple located near each exhaust port. These thermocouples are inexpensive, durable and easy to install. However, conventional exhaust thermocouples have slow transient response to charges in temperature, because they must be large enough to provide adequate durability. Consequently, the signals from these sensors can only provide an indication of the time-averaged exhaust temperature value over many engine cycles. These slow response temperature signals can be used to detect severe cylinder faults such as continuous misfiring by comparing the signal values to predetermined thresholds or current average values for all of the engine cylinders. U.S. Pat. Nos. 3,939,711 and 4,122,720 describe examples of this type of system. None of these prior art approaches to exhaust temperature monitoring have provided cycle-by-cycle information suitable for cyclic variability monitoring.

What is needed is a means of monitoring cyclic variability that combines the desirable attributes of exhaust port thermocouples (durable, inexpensive, easily installed, and providing an isolated signal for each cylinder) with the ability to measure low levels of cyclic variability like in-cylinder pressure sensors. In view of the foregoing, the primary object of the invention is to provide a method for monitoring cyclic variability in a reciprocating engine by analyzing exhaust gas temperature sensor signals. As used herein, the term cyclic variability is interchangeable with other commonly used terms including cyclic variation, combustion variation, combustion variability, cyclic dispersion, combustion instability and engine instability. The cycle-to-cycle variations that are monitored can include differences between cycles with complete or nearly complete combustion and the detection of cycles with abnormal combustion such as misfire and incomplete burning. The cyclic variability information obtained by the invention has uses which include providing feedback signals for an engine control system, providing input signals for an engine diagnostic system, and providing input signals for an engine instrument panel.

DETAILED DESCRIPTION OF THE PRESENTLY PREFERRED EMBODIMENT

Figure 1:
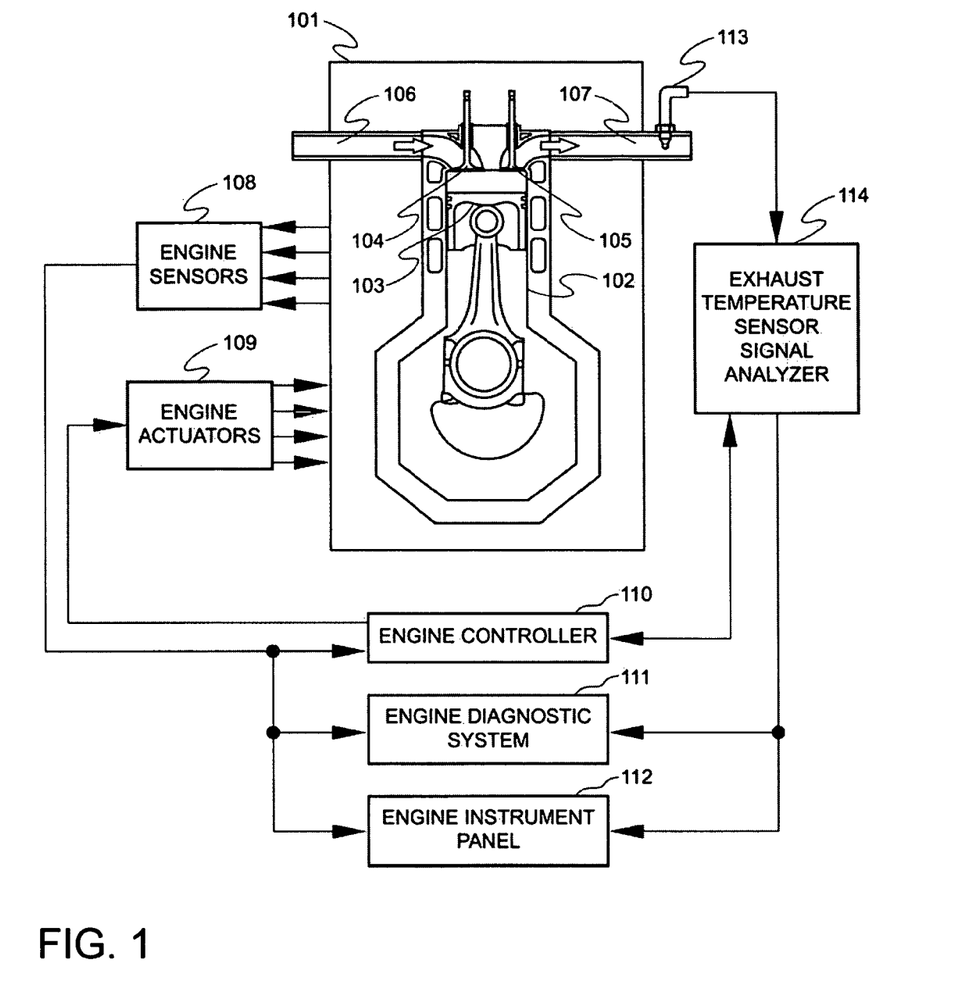
FIG. 1 is a diagram illustrating a system for monitoring cyclic variability and using cyclic variability signals according to the present invention.

Referring initially to FIG. 1, a system exemplifying the present invention is shown. The reciprocating engine 101 includes an engine cylinder 102, a piston 103, an intake valve arrangement 104 and an exhaust valve arrangement 105. The reciprocating engine 101 may be a type that operates using either a 4-stroke gas exchange process or a 2-stroke gas exchange process. The intake valve arrangement 104 may be comprised of one or more poppet valves as depicted in FIG. 1 or one or more ports in the cylinder wall that are alternately covered and uncovered by the piston 103 as the piston changes position. The exhaust valve arrangement 105 may be comprised of one or more poppet valves as depicted in FIG. 1 or one or more port in the cylinder wall that are alternately covered and uncovered by the piston 103 as the piston changes position. The engine includes an intake passage 106 in communication with the cylinder 102 through the intake valve arrangement 104. An exhaust passage 110 receives exhaust gases from the cylinder 102 via the exhaust valve arrangement 105.

The reciprocating engine 101 may employ any of the combustion systems known in prior art including but not limited to premixed charge spark ignition, direct injection spark ignition, direct injection compression ignition (commonly known as a diesel engine), direct injection compression ignition with premixed charge gaseous fuel (commonly known as a dual fuel engine) and direct injection compression ignition with direct injected gaseous fuel (commonly known as a gas-diesel engine).

The reciprocating engine 101 may be equipped with a system of sensors 108 and a system of actuators 109. An engine controller 110 receives signals from the sensor system 108 and outputs signals to the actuator system 109 to achieve and maintain the desired operating conditions with regard to power, fuel efficiency and pollutant emissions. The engine 101 may also be equipped with a diagnostic system 111 that receives signals from the sensor system 108 and detects faulty operation or faulty components. The engine 101 may also be equipped with an instrument panel system 112 that provides an indication of sensor signals and fault occurrences to the person or persons operating the engine (hereafter referred to as the engine operator).

An exhaust temperature sensor 113 is mounted in the exhaust passage 107 so that it is exposed to the exhaust gases flowing through the exhaust passage 107. The signal from the exhaust temperature sensor 113 is received by the exhaust temperature sensor signal analyzer 114. The exhaust temperature sensor signal analyzer 114 contains circuitry for measuring and analyzing the signal from the exhaust gas temperature sensor 113 in order to determine the cyclic variability of the reciprocating engine 101. The exhaust temperature sensor signal analyzer 114 may receive signals from the engine controller 110 to facilitate this analysis.

The exhaust temperature sensor signal analyzer 114 outputs one or more signals related to the cyclic variability of the reciprocating engine 101. If the reciprocating engine 101 is equipped with an engine controller 110, said cyclic variability signals are provided to the controller. The engine controller 110 can interpret if said cyclic variability signals indicate the need for control modifications and determine what if any action to take. In other words the engine controller 110 can implement closed loop control strategies based upon the cyclic variability signals from the exhaust temperature sensor signal analyzer 114. The actions that can be taken include modifying the output signals from the engine controller 110 to the actuator system 107 to vary parameters such as air/fuel ratio, exhaust gas recirculation levels, ignition timing, and fuel injection parameters. Additional closed loop control strategies based upon the cyclic variability signals provided by the exhaust temperature sensor signal analyzer 114 will become apparent to those of ordinary skill in the art.

The cyclic variability signals from the exhaust temperature sensor signal analyzer 114 are also provided to the diagnostic system 111 such as an onboard diagnostic system for a vehicle or a condition monitoring system for stationary engines. Said diagnostics and monitoring systems can interpret if said cyclic variability signals indicate faults in components or control settings. Based upon said interpretation, the diagnostic system can alert the engine operator when corrective actions need to be taken, manage alarms, or activate an automated engine shut down system. Such diagnostics and monitoring systems can also provide recording and trend analysis of said cyclic variability signals for prognostic applications. The cyclic variability signals from the exhaust temperature sensor signal analyzer 114 are also provided to an instrument panel system 112 where they are displayed using actual or virtual instruments such as panel meters and status indicator displays. The engine monitoring system 112 is observed by the engine operator who interprets the signals and takes corrective actions when needed.

In the best mode embodiment of the invention, the exhaust gas temperature sensor 113 is a chromel-alumel thermocouple surrounded by a protective sheath made of hastalloy with the thermocouple junction in contact with the interior of the protective sheath. This is otherwise known as a grounded junction sheathed thermocouple probe and is familiar to those skilled in the art. The preferred embodiment employs a thermocouple probe design with a reduced diameter at the tip to improve the signal response to rapid changes in temperature while maintaining adequate ruggedness. The reduced tip probe design is known in prior art. Alternate embodiments may use different types of exhaust gas temperature sensors such as different thermocouple designs, thermostats or resistive temperature detectors.

Figure 2:
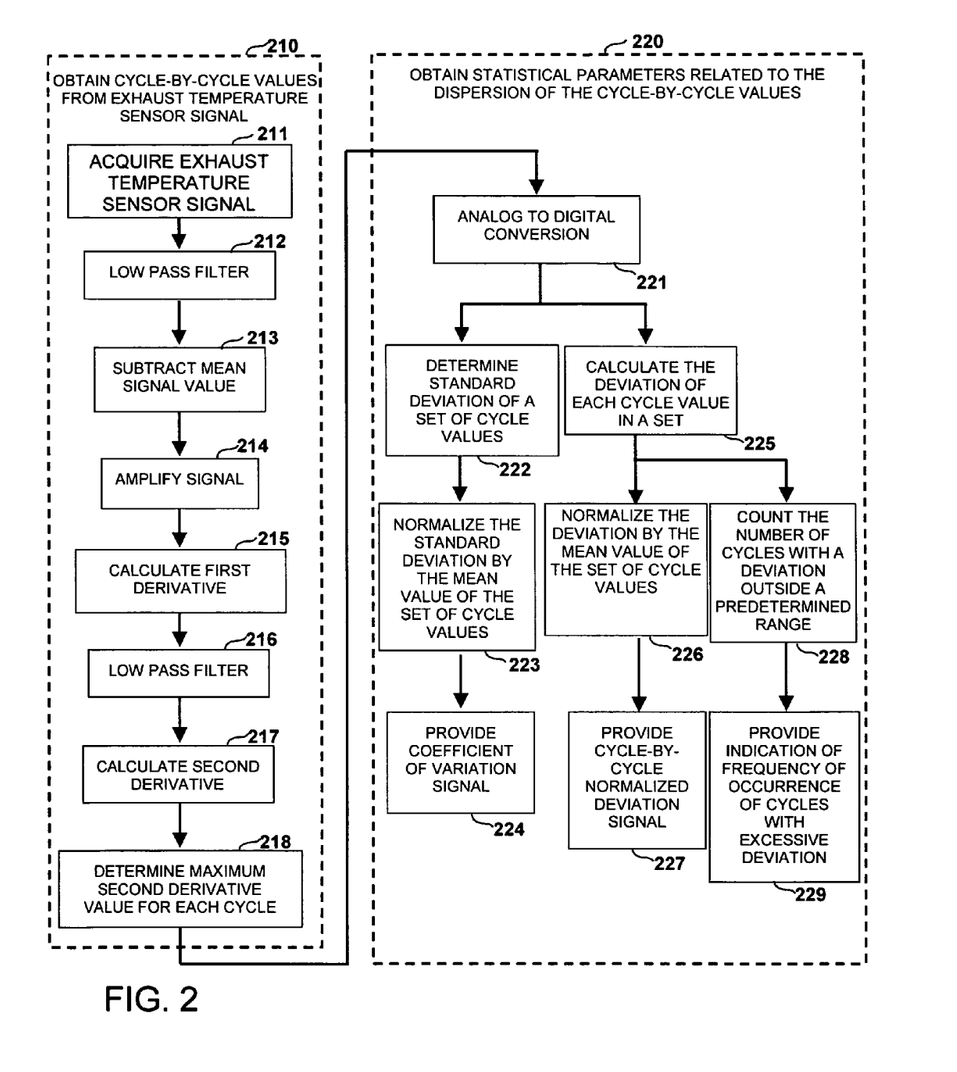
FIG. 2 is a flow chart depicting a method of obtaining cyclic variability signals and indications from an exhaust gas temperature sensor signal according to the present invention.

FIG. 2 is a flow chart illustrating the best mode embodiment of the method for analyzing the exhaust temperature sensor signal. Those skilled in the art will recognize that each step in the method may be accomplished using either analog signal processing techniques, digital signal processing techniques or combinations of analog and digital signal processing techniques. The signal processing may use time domain analysis and/or frequency domain analysis.

The method illustrated in FIG. 2 has two main steps. In Step 210, cycle-by-cycle values are obtained from the exhaust temperature sensor signal. In Step 220, statistical parameters related to the dispersion of the cycle-by-cycle values are obtained. Step 210 is comprised of Steps 211-218. Step 220 is comprised of steps 221-229.

In Step 211, the raw signal from the exhaust temperature sensor is acquired using well known methods to minimize signal noise from noise sources such as ground loops, radio frequency interference and electromagnetic interference.

Then in Step 212, the raw signal is low pass filtered to attenuate high frequency noise, particularly that from ignition systems. Alternative embodiments of the invention may eliminate this step or may include additional or alternative low pass filtering stages at various locations in the signal processing sequence. Next, in Step 213 all or part of the average signal value is removed. For example, an exhaust temperature sensor installed in a reciprocating engine may reach an average temperature of several hundred degrees Celsius but the cycle-by-cycle temperature fluctuations of the sensor may be only a fraction of a degree Celsius. A primary function of this step is to reduce the overall magnitude of the signal without affecting the cycle-by-cycle fluctuations the signal contains.

In the preferred embodiment, Step 213 is accomplished by offsetting the unamplified signal by an amount similar to the current average signal value. Alternative embodiments of the invention may perform this step after amplifying the signal. Alternative embodiments may accomplish this step by high pass filtering either the unamplified signal or an amplified version of the signal. Alternative embodiments may eliminate this step. Examples when Step 213 may be eliminated include whose where the raw or filtered signal from the exhaust temperature sensor is sampled by an analog to digital conversion system capable of obtaining high fidelity data for the cycle-by-cycle signal fluctuations where the average signal value has not been reduced or removed.

Next in Step 214 the signal is amplified. The gain that can be used in the amplification step is limited by the magnitude of the input signal since the output of an amplifier will saturate (remain at its maximum level) once the product of the input signal and the gain exceeds the maximum output level. In the preferred embodiment of the removal of the average signal value accomplished in Step 213 makes it possible to amplify the cycle-by-cycle signal fluctuations using greater gain than would be possible if Step 213 was not performed. Greater gain in the amplification stage is desirable because it may improve the signal to noise ratio prior to the signal processing steps which follow.

In the preferred embodiment, Step 214 is accomplished in a single stage using an instrumentation amplifier. Alternative embodiments may employ other devices for amplification and may perform the amplification in more than one stage and may include other signal processing steps between the amplification stages. Alternative embodiments may eliminate the amplification step. For example, this step would be unnecessary if analog to digital conversion was carried out in an earlier step.

Next in Step 215, the signal is differentiated to obtain first derivative data. In the preferred embodiment, this step is accomplished using a well know analog circuit commonly referred to as a compensated differentiator. Alternative embodiments may calculate the first derivative using digital signal processing techniques and may employ time domain analysis or frequency domain analysis. All analysis techniques which determine a slope related to the signal shape or curvature are by definition differentiation processes and include determining the slope of a portion of the signal waveforms, determining the slope of a line tangent to the curve and determining the slope of a line joining points on the curve.

Next in Step 216, the signal is low pass filtered. In the preferred embodiment, this step is taken to reduce signal noise features which tend to be amplified by the differentiation process and is accomplished using an analog active filter. Alternative embodiments may use digital filtering techniques or may eliminate this step.

Next in Sept 217, the signal is differentiated a second time to obtain second derivative data. As in Sept 215, this step is accomplished using an analog compensated differentiator in the preferred embodiment. The other statements regarding alternative embodiments for Step 215 also apply to Step 217.

Next in Step 218, the peak positive value of the second derivative data is determined for each cycle. In the preferred embodiment, this step is accomplished using an analog peak detector. Alternative embodiments may use digital signal processing techniques to accomplish this step.

The objective of Steps 211-218 is to obtain from an exhaust temperature sensor signal, cycle-by-cycle values the magnitude of which are related to one or more combustion characteristics of the respective cycle. In the preferred embodiment the cycle-by-cycle value is the peak positive value of the second derivative of the exhaust temperature sensor signal. Alternative embodiments may obtain the cycle-by-cycle value from other functions of the exhaust temperature sensor signal including functions involving at least one of the signal fluctuations, the first derivative of the signal fluctuations and third, fourth or higher order derivatives of the signal fluctuations. Alternative embodiments may obtain the cycle-by-cycle value from the selected function using alternatives to the determination of the peak positive value of the function. Such alternatives may include the determination of other peak values, peak-to-peak values, slopes, root mean square values and the analysis of signal feature within predetermined portions of the selected function.

The objective of the remaining steps in the method depicted in FIG. 2 is to obtain statistical data from sets of cycle-by-cycle values. Statistical parameters which are related to the dispersion of the cycle-by-cycle values can provide an indication of the cyclic variability of the engine. In the preferred embodiment, more than one statistical parameter is used.

In Step 221 of the preferred embodiment, the signal is converted from analog to digital form. This step in the method is the preferred point for analog to digital conversion because the data has already been reduced to one value per cycle in Step 218, thereby reducing the sampling frequency requirements of the analog to digital converter. Analog to digital conversion is performed in the preferred embodiment so that the following steps involving statistical analysis can be performed by digital signal processing techniques. Alternative embodiments may perform analog to digital conversion earlier or later in the method or eliminate analog to digital conversion where the statistical analysis steps are performed by analog computational techniques.

Next, in Step 222 the standard deviation of a set of cycle-by-cycle values is calculated. The number of cycle-by-cycle values used in the calculation may be controlled by analyzing a selected cycle count or a selected time interval. The cycle count may be based upon a signal received from the engine controller 110. Next, in Step 223 the standard deviation value is normalized by the mean value of the same set of cycle-by-cycle values used to calculate the standard deviation. This normalized standard deviation value is commonly known as the coefficient of variation. In Step 224, the coefficient of variation signal is provided to systems such as an engine controller, engine diagnostic system or engine instrument panel system.

In a parallel process, in Step 225, the deviation of each cycle-by-cycle value is calculated. The mean value used to calculate the deviation may be based upon a number of cycles that is different from the number of cycles used to calculate the standard deviation in Step 222. Next in Step 226, the absolute value of the deviation of each cycle is normalized by the mean value used to calculate the deviation. Next in Step 227, the normalized cycle-by-cycle absolute deviation signal is provided to systems such as an engine controller, engine diagnostic system or engine instrument panel system.

In another parallel process, in Step 228, the deviation of each cycle is compared with predetermined positive and negative threshold values. Cycles with values outside of a predetermined range bounded by the threshold values are identified and counted. Next in Step 229, an indication of the occurrence of cycles outside of the predetermined range and/or an indication of the frequency of occurrence of such cycles is provided to systems such as an engine controller, engine diagnostic system or engine instrument panel system.

Figure 3A:
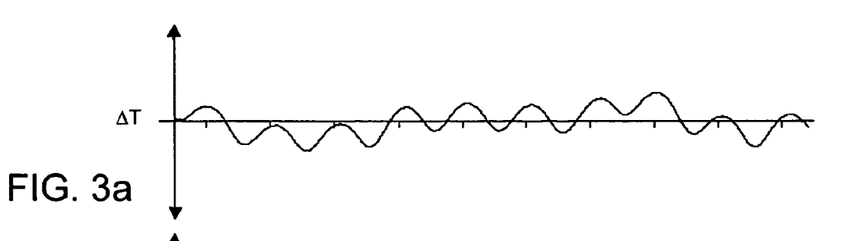
FIG. 3a is an example of the signal waveform from a series of 10 engines cycles obtained in Step 214 of the method depicted in FIG. 2.
Figure 3B:
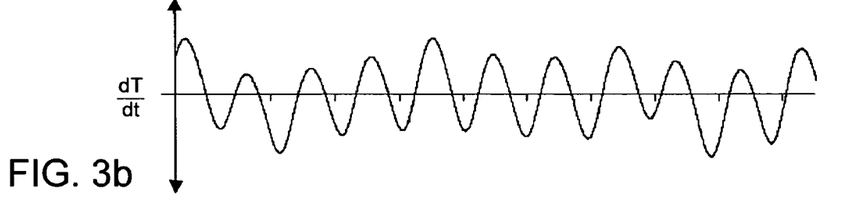
FIG. 3b is an example of the signal waveform from a series of 10 engine cycles obtained in Step 216 of the method depicted in FIG. 2.
Figure 3C:
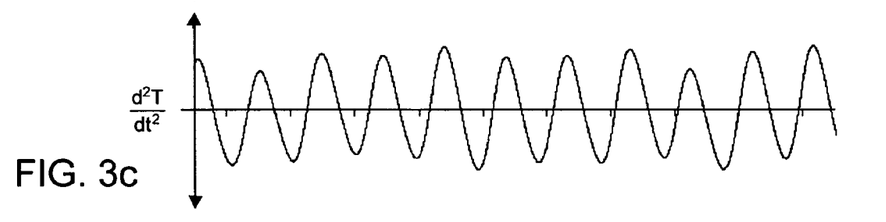
FIG. 3c is an example of the signal waveform from a series of 10 engine cycles obtained in Step 217 of the method depicted in FIG. 2.
Figure 3D:
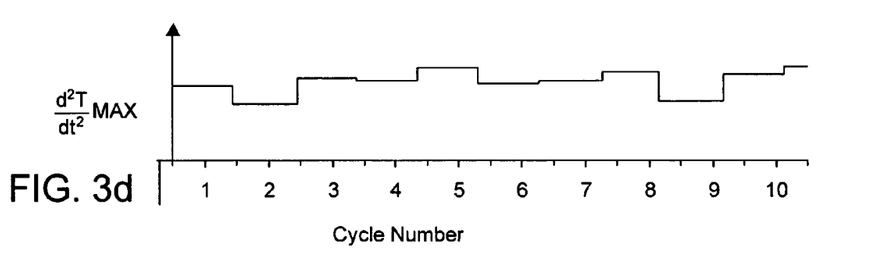
FIG. 3d is an example of the signal waveform from a series of 10 engine cycles obtained in Step 218 of the method depicted in FIG. 2

FIGS. 3a-3d illustrate examples of typical signal waveforms acquired for 10 engine cycles within Step 210 of the method depicted in FIG. 2. FIG. 3a is an example of the cycle-by cycle signal fluctuations from the exhaust temperature sensor (ΔT) obtained by Steps 211-214 of the method. FIG. 3b is an example of the first derivative waveform of the signal fluctuation $$\left(\frac{dT}{dt}\right)$$

obtained by Step 215, after low pass filtering in Step 216. FIG. 3c is an example of the second derivative waveform of the signal fluctuation $$\left(\frac{d^2T}{dt^2}\right)$$

obtained by Step 217. FIG. 3d is an example of the maximum value of the second derivative waveform corresponding to each engine cycle $$\left(\frac{d^2T}{dt^2}\text{MAX}\right)$$

obtained by Step 218.

Figure 4A:
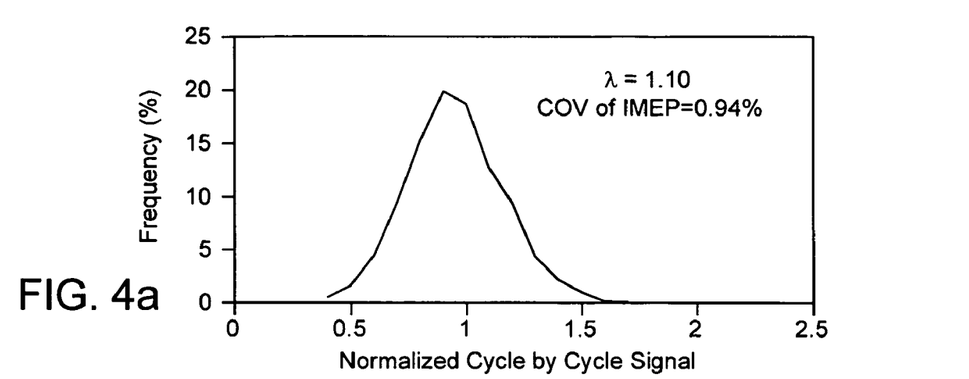
FIG. 4a is a graphical illustration of experimental data showing the normalized frequency distribution of 1500 cycle-by-cycle values obtained in Step 210 of the method depicted in FIG. 2, recorded from an engine operating at 1800rpm, 3bar BMEP with an excess air factor ($\lambda$) of 1.10.
Figure 4B:
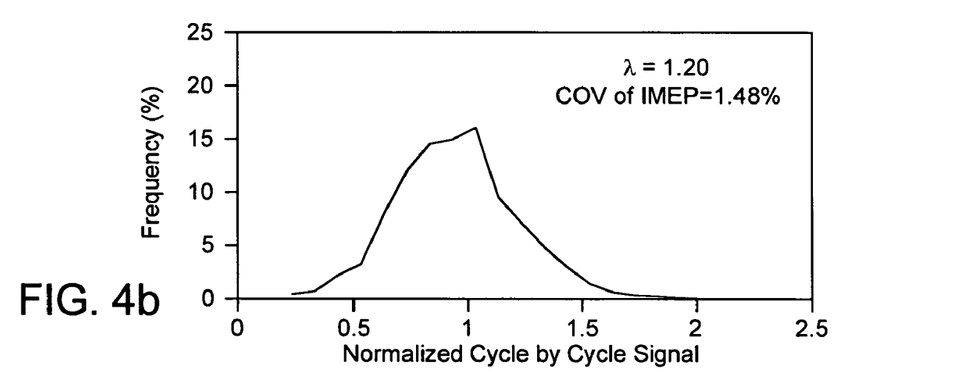
FIG. 4b is a graphical illustration of experimental data showing the normalized frequency distribution of 1500cycle-by-cycle values obtained in Step 210 of the method depicted in FIG. 2, recorded from an engine operating at 1800rpm, 3bar BMEP with an excess air factor ($\lambda$) of 1.20
Figure 4C:
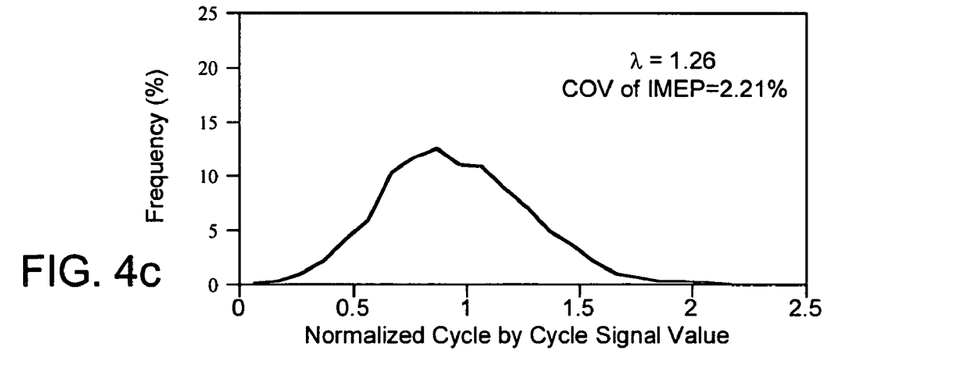
FIG. 4c is a graphical illustration of experimental data showing the normalized frequency distribution of 1500 cycle-by-cycle values obtained in Step 210 of the method depicted in FIG. 2, recorded for an engine operating at 1800 rpm, 3 bar BMEP with an excess air factor ($\lambda$) of 1.26.

FIGS. 4a-4c are graphical illustrations of experimental data showing the normalized frequency distribution of cycle-by-cycle values obtained in Step 210 of the method depicted in FIG. 2. The experimental data illustrated in FIGS. 4a-4c was recorded from one cylinder of a propane fueled spark ignition engine operating at a speed of 1800 revolutions per minute (RPM), a load of 3 bar brake mean effective pressure (BMEP), excess air factors (λ) ranging from 1.10-1.26, and with the spark timing adjusted at each excess air setting to provide a peak cylinder pressure location of 16° after top dead center (ATDC). FIGS. 4a-4c also show the coefficient of variation of indicated mean effective pressure (COV of IMEP) for their respective excess air settings. The COV of IMEP is the standard measure of cyclic variability in prior art determined by experimental measurements of cylinder pressure and crankshaft position and conventional data analysis techniques well known in the art.

In FIGS. 4a-4c, the COV of IMEP becomes greater as the excess air factor is increased, indicating that the cyclic variability of the engine is greater. FIGS. 4a-4c illustrate that the frequency distribution of the cycle-by-cycle values obtained according to the invention becomes wider as the excess air ratio and cyclic variability (indicated by the COV of IMEP) become greater. This demonstrates that a series of such cycle-by-cycle values can provide useful information for determining the cyclic variability of the engine.

Those skilled in the art will recognize that a variety of statistical parameters may be used to describe the distribution of a set of values, and any of these statistical parameters could by employed by skilled artisans in the practice of the invention described herein. One of the statistical parameters chosen for the preferred embodiment of the invention is the coefficient of variation (COV), because this parameter is commonly used in prior art to indicate the cyclic variability of indicated mean effective pressure (IMEP) values obtained from cylinder pressure measurements. (i.e., the COV of IMEP, as previously discussed).

Figure 5:
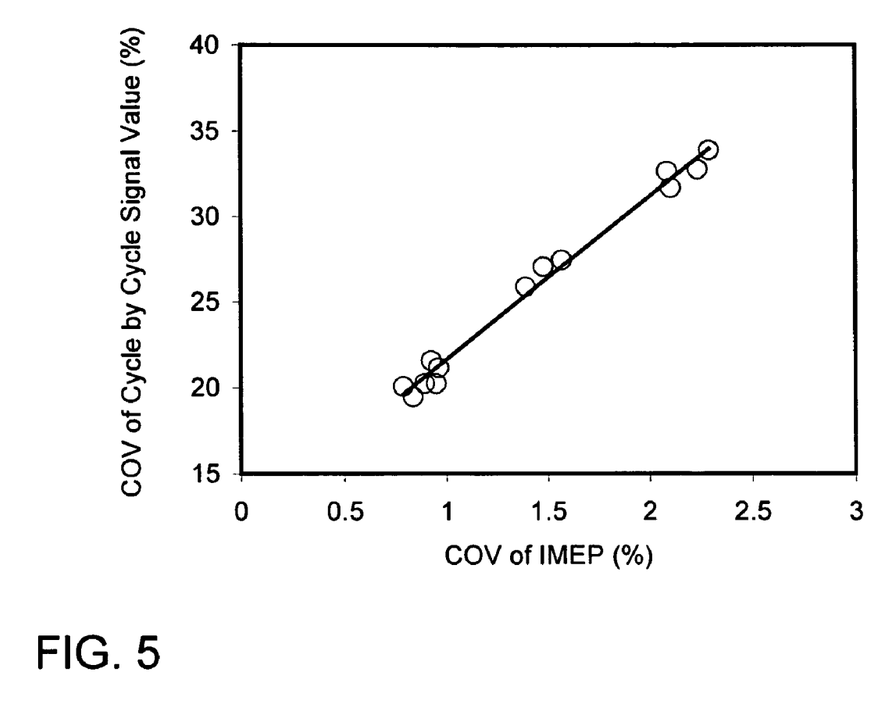
FIG. 5 is a graphical illustration of experimental data showing a correlation between the coefficient of variation of the cycle-by-cycle values obtained in Step 224 of the method depicted in FIG. 2 and the coefficient of variation of indicated mean effective pressure obtained through conventional analysis of cylinder pressure measurements recorded for an engine operating condition of 1800 rpm, 3 bar BMEP with excess air factors ($\lambda$) ranging from 1.1-1.26.

FIG. 5 is a graphical illustration of experimental data showing a correlation between the coefficient of variation of the cycle-by-cycle values obtained in Step 224 of the method depicted in FIG. 2 and the COV of IMEP obtained through conventional analysis of cylinder pressure measurements. The data was recorded using the same engine operating conditions described previously for FIG. 4a-4c, and each data point represents the COV for a set of 500 engine cycles. In FIG. 5 it can be seen that the relationship between the COV of the cycle-by-cycle values of the invention and the COV of IMEP is linear for the conditions used in the example, and that it is possible to detect changes in cyclic variability at levels corresponding to less than 2% COV of IMEP.

What is claimed is the following:

1. A method of monitoring the cyclic variability of combustion of one or more cylinders of a reciprocating internal combustion engine, the method comprising the steps of:
   acquiring one or more exhaust temperature sensor signals;
   obtaining from each signal cycle-by-cycle values, wherein each of said values corresponds to one engine cycle, wherein said engine cycle is completed during not more than two crankshaft revolutions of said reciprocating internal combustion engine, wherein the magnitude of each of said values is related to one or more combustion characteristics of the corresponding engine cycle;
   obtaining one or more statistical parameters related to the dispersion of sets of said cycle-by-cycle values;
   providing an indication of the cyclic variability of the engine based upon said statistical parameters.

2. The method of claim 1, wherein said exhaust temperature signals are provided by exhaust temperature sensors located in the exhaust passages of one or more cylinders of said reciprocating internal combustion engine.

3. The method of claim 2, wherein said exhaust temperature sensors are thermocouples.

4. The method of claim 2, wherein said exhaust temperature sensors are resistance temperature detectors.

5. The method of claim 1, wherein the step of obtaining said cycle-by-cycle values includes differentiation of said exhaust temperature sensor signals.

6. The method of claim 5, wherein the step of obtaining said cycle-by-cycle values further includes the determination of the peak positive second derivative value for each cycle.

7. The method of claim 5 wherein said differentiation of said exhaust temperature signals is accomplished using analog signal processing techniques.

8. The method of claim 5 wherein said differentiation of said exhaust temperature signals is accomplished using digital signal processing techniques.

9. The method of claim 5, wherein said differentiation of said exhaust temperature signals is accomplished using time domain analysis.

10. The method of claim 5 wherein said differentiation of said exhaust temperature signals is accomplished using frequency domain analysis.

11. The method of claim 1 wherein said statistical parameters include the coefficient of variation of said cycle-by-cycle values.

12. The method of claim 1 wherein said statistical parameters include the standard deviation of said cycle-by-cycle values.

13. The method of claim 1 wherein said statistical parameters include the average deviation of said cycle-by-cycle values.

14. The method of claim 1 wherein said statistical parameters include the deviation of each of said cycle-by-cycle values.

15. A system for monitoring the cyclic variability of combustion of one or more cylinders of a reciprocating internal combustion engine, the system comprising:
   a means for acquiring one or more exhaust temperature sensor signals;
   a means for obtaining from each signal cycle-by-cycle values the magnitude of which are related to one or more combustion characteristics of the respective cycle;
   a means for obtaining one or more statistical parameters related to the dispersion of sets of said cycle-by-cycle values;
   a means for providing an indication of the cyclic variability of the engine based upon said statistical parameters.

16. A system in accordance with claim 15, wherein said exhaust temperature signals are provided by exhaust temperature sensors located in the exhaust passages of one or more cylinders of said reciprocating internal combustion engine.

17. A system in accordance with claim 16, wherein said exhaust temperature sensors are thermocouples.

18. A system in accordance with claim 16, wherein said exhaust temperature sensors are resistance temperature detectors.

19. A system in accordance with claim 15, wherein the means for obtaining said cycle-by-cycle values include means for differentiation of said exhaust temperature sensor signals.

20. A system in accordance with claim 15 wherein the means for obtaining said cycle-by-cycle values further includes means for determination of the peak positive second derivative value for each cycle.

21. A system in accordance with claim 19 wherein said means for differentiation of said exhaust temperature signals include analog signal processing techniques.

22. A system in accordance with claim 19 wherein said means for differentiation of said exhaust temperature signals includes digital signal processing techniques.

23. A system in accordance with claim 19, wherein said means for differentiation of said exhaust temperature signals includes time domain analysis.

24. A system in accordance with claim 19 wherein said means for differentiation of said exhaust temperature signals includes frequency domain analysis.

25. A system in accordance with claim 15 wherein said statistical parameters include the coefficient of variation of said cycle-by-cycle values.

26. A system in accordance with claim 15 wherein said statistical parameters include the standard deviation of said cycle-by-cycle values.

27. A system in accordance with claim 15 wherein said statistical parameters include the average deviation of said cycle-by-cycle values.

28. A system in accordance with claim 15 wherein said statistical parameters include the deviation of each of said cycle-by-cycle values.

* * * * *